(12) United States Patent
Corona

(10) Patent No.: US 7,975,106 B2
(45) Date of Patent: Jul. 5, 2011

(54) MANAGING DEVICE CONFIGURATIONS AND DOCUMENTS WORKFLOW THROUGH A PORTABLE STORAGE DEVICE

(75) Inventor: Fatima Corona, Long Beach, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 512 days.

(21) Appl. No.: 12/118,617

(22) Filed: May 9, 2008

(65) Prior Publication Data

US 2009/0282193 A1  Nov. 12, 2009

(51) Int. Cl.
*G06F 12/00* (2006.01)
(52) U.S. Cl. ...................................... 711/115
(58) Field of Classification Search .................. None
See application file for complete search history.

(56) References Cited

U.S. PATENT DOCUMENTS

2008/0285073 A1* 11/2008 Sawayanagi et al. ........ 358/1.15
2009/0262385 A1  10/2009 Dantwala

* cited by examiner

*Primary Examiner* — Hiep T Nguyen

(57) ABSTRACT

An MFP that is configured to receive instruction sets for processing documents, such as workflows, from a portable memory device. The MFP may be part of a larger network computer system and may also be able to receive workflows for processing documents from other components of the system in addition to the portable memory device. The portable memory device may comprise a memory stick, or any other portable electronic device that has memory functionality. The system may also be able to filter files on the portable memory device so that the MFP only receives workflow files related to processing documents.

25 Claims, 5 Drawing Sheets

MANAGING DEVICE CONFIGURATIONS AND DOCUMENTS WORKFLOW THROUGH A PORTABLE STORAGE DEVICE

BACKGROUND OF THE INVENTION

1. Field of the Invention

The present invention relates to computer devices and, in particular, multi-function peripheral devices (MFPs) for which instruction sets, such as workflows or device configuration parameters, can be provided to the MFP device via either a network or a portable memory device such as USB memory stick.

2. Description of the Related Art

Multi-function peripheral devices are devices that can process documents in a number of different ways. Typically most MFPs include printing, scanning, copying and transmitting capabilities. Generally, one or more MFPs are associated with a computer network such that jobs can be transmitted to the MFP from computers associated with the network. In this way, documents can be printed or copied according to preselected parameters that are selected at the computer. Alternatively, MFPs also include a control panel that allows a user to configure the MFP at the MFP location itself. In this way, an MFP can be used to scan a document or transmit an electronic version of the document either by fax or email, to a desired destination.

As the functionality of MFPs has grown, preselected routines, often referred to as workflows, have been developed to process documents in a desired manner. More specifically, a workflow is the manner in which a particular type of document is to be processed and the workflow can be stored such that a user can recall the workflow at either the MFP control panel or on a computer in the network. Workflows can include parameter settings for the MFP, specific instructions as to how to process a particular document, e.g., printing parameters, scanning parameters, etc. and also delivery instructions for providing the documents to desired destinations. In more complex networks, where many multiple different workflows may be developed for processing many different types of documents, the workflows may be stored in a server or some sort of shared folder accessible to multiple computers and MFPs. Alternatively, the workflows can also be stored in memory associated with a selected MFP itself. However, the storage of workflows on shared servers or on MFPs can lead to several problems.

For example, if access to the shared folder or server where the workflow is stored is somehow interrupted, individuals cannot have their jobs processed by an MFP until the access interruption is corrected. Further, processing of some sensitive documents or the use of particular workflows may be restricted to selected individuals. Having the workflows on a shared server or on an MFP that is accessible to other people may result in the workflow being more accessible to unauthorized individuals.

With respect to storing the workflow in the memory of the MFP, over time, the memory may become full thereby limiting an individual user's ability to add additional instruction sets to the MFPs memory. The foregoing underscores that there is an ongoing need for a more flexible way of storing and providing instruction sets such as workflows, device configurations and the like to MFPs. To this end, there is a need for a mechanism for storing instruction sets for MFPs that can be independent of the operation of shared folders and servers and further are less compromised by memory restrictions within MFP itself.

SUMMARY OF THE INVENTION

The aforementioned needs are satisfied, in one instance, by an MFP that is configured to communicate with a portable memory device upon having instruction sets for the MFP. In this particular embodiment, the MFP is configured so as to be able to receive the instruction sets on the portable memory device and then process a document according to the instruction set. In one particular implementation, the MFP and/or portable memory device is capable of filtering the documents contained on the portable memory device so that the MFP can obtain only instruction sets for processing documents. In another particular implementation, the MFP is capable of displaying the instruction sets received from the portable memory device thereby allowing a user to select from a plurality of instruction sets received from the portable electronic device. In one embodiment, the portable electronic device comprises a USB flash memory device but can include any of a number of portable electronic devices such as cell phones, MP3 players, memory cards and the like, that have a memory suitable for storing an instruction set for an MFP.

By enabling an MFP to receive instruction sets, including workflows, from a portable memory device allows the MFP to be used by a user more independently of the MFPs memory or any associated server or shared file. As such, the operation of the MFP is more independent of access or memory constraints of the system. Moreover, operation of the MFP can also be performed in a more secure fashion as the user can design custom instruction sets or workflows that are only accessible to the user. These and other objects and advantages of the present invention will become more apparent from the following discussion taken in conjunction with the accompanied drawings.

DETAILED DESCRIPTION OF THE PREFERRED EMBODIMENT

Figure 1:
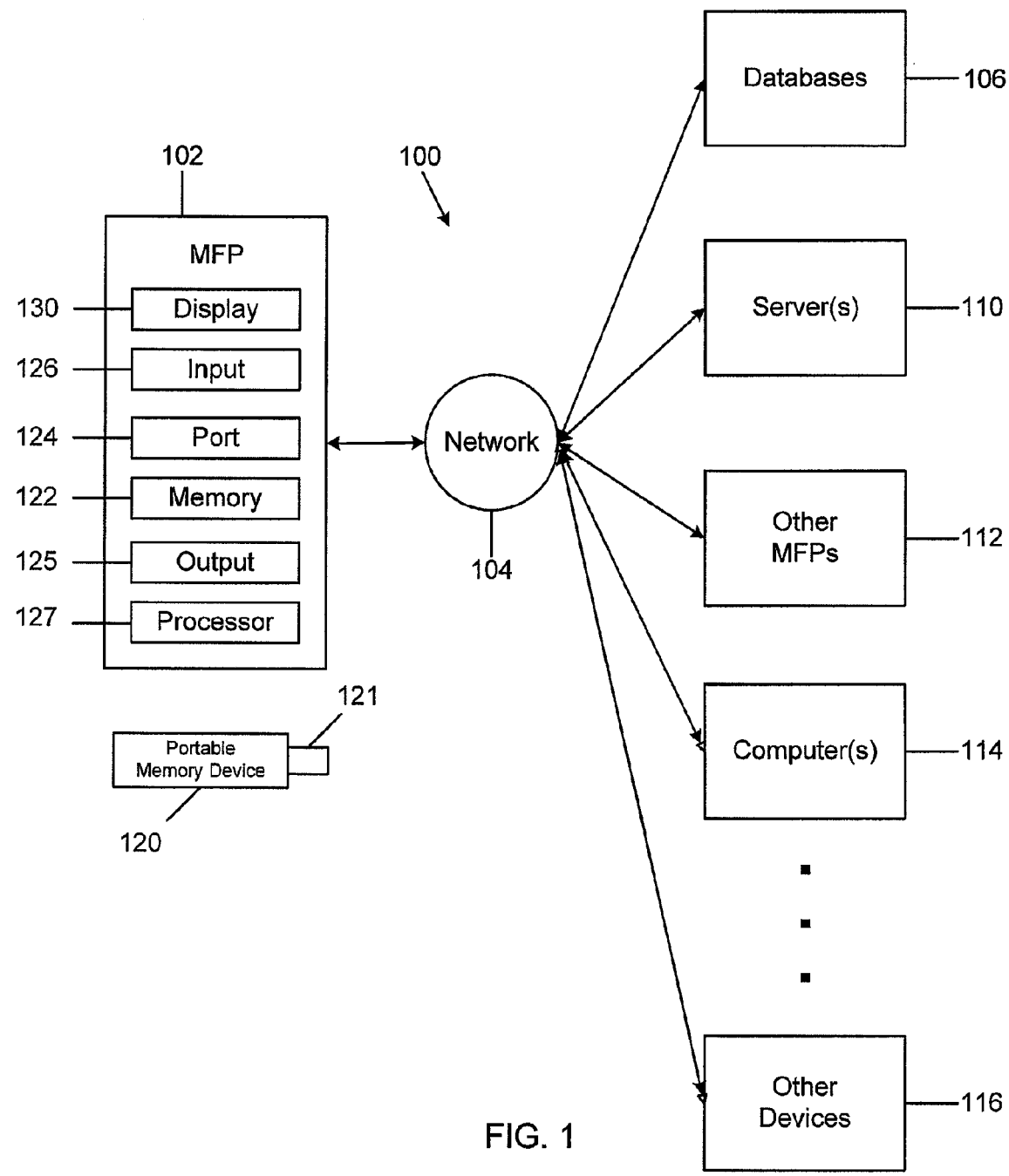
FIG. 1 is a functional block diagram illustrating the MFP and portable memory device and the associated system of one exemplary embodiment of the present invention.

Reference will now be made to the drawings wherein like numerals refer to like parts throughout. As is shown in FIG. 1, in one embodiment a network computer system 100 includes at least one MFP 102. The network computer system 100 can comprise any of a number of different network devices and it will be appreciated that the network computer system 100 shown in FIG. 1 is simply exemplary of one of literally countless different configurations of networks and MFPs. In general, the network computer system 100 includes a network 104 which can be a wired network, a wireless network, an internet or intranet or some combination thereof. As shown, one or more MFPs 102 are connected to a plurality of other devices or functional construct via the network 104. The other devices or functional constructs can include databases 106, servers 110, other MFP devices 112, other computers 114, such as personal computers and any other devices 116 that can be used with MFP devices in conjunction with the network 104.

The MFP device 102 is a device that is capable of performing a variety of different document processing functions. Specifically, the MFP device 102 can be used as a printer for printing documents that are prepared by the computers 114 and sent to the MFP device 102 via the network 104 and can also be used for printing faxes and other electronic communication received via fax machine, modem and the like. The MFP 102 further includes an input 126 that allows the MFP to scan documents for electronic transmission via the network 104 to any of the other network devices or for replication as a photocopier. As is also shown, the MFP also includes a processor 127 that implements the workflows or the processes shown in FIGS. 3, 4A and 4B.

The MFP 102 includes additional functionality that allows for particular processing of documents according to preselected instruction sets, such as workflows or device parameter settings or some combination thereof. The preselected instruction set can be stored in a memory 122 of the MFP 102, on shared files accessible to other MFPs, in the databases 106, in files structures contained within the servers 110 or in the computers 114. The operation of the MFP 102 in processing documents according to a selected workflow that are stored either internally on the memory 122 of the MFP 102 or in the databases 106, servers 110, computers 114 or other devices can be performed in any of a number of manners known in the art.

Advantageously, the MFP 102 is further configured to have an interface such as a port 124 that is capable of engaging with a portable memory device 120 so that instruction sets, such as workflows, device parameter settings, security protocols and the like stored on the portable memory device 120 can be implemented by the MFP 102 to process one or more documents. The port 124 can comprise any of a number of interfaces including a physical port, such as a USB port, capable of receiving USB connectors 121 on the portable memory device 120. It will, however, be appreciated that the port 124 can comprise any of a number of different configurations of physical port or functional ports that are capable of communicating with a portable electronic devices using, for example, electromagnetic or optical signals.

In one particular implementation, the portable memory device 120 comprises a memory stick that includes flash memory or an equivalent upon which the instruction sets, such as workflows, can be stored. It will be appreciated that the portable memory device can comprise literally any portable device that is hand carryable by a user and can include such things as personal electronic devices such as iPods, cell phones, PDAs, or portable memory components such as CDs, memory cards, or removable discs. In this way, the instruction sets for processing particular documents can be supplied to the MFP 102 more independently of operational constraints of the network 104 and the internal memory 122 of the MFP 102.

Figure 2:
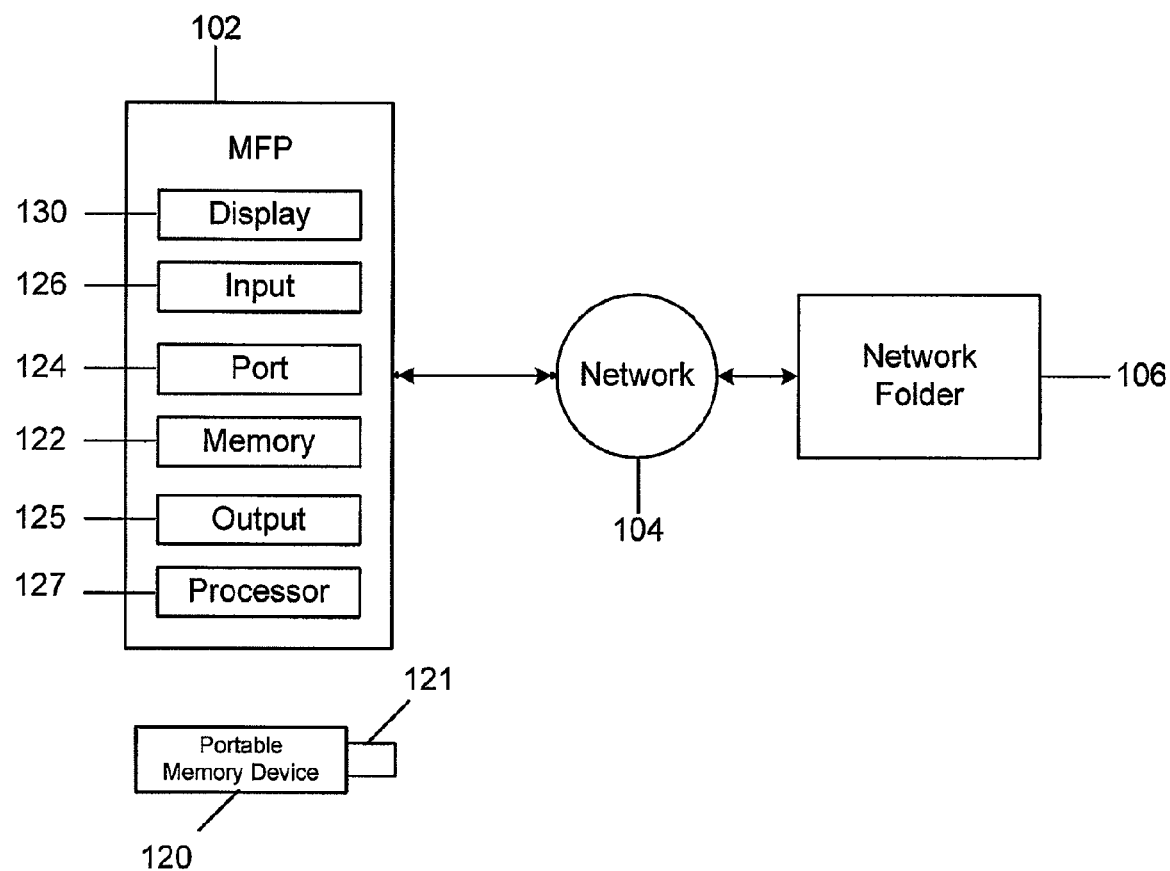
FIG. 2 is a functional block diagram illustrating the interaction between the MFP, a portable memory device and a network memory location in which instruction sets for the MFP can be stored.

Referring to FIG. 2, a further possible configuration of the system 100 is shown. More specifically, the MFP 102 may be able to access instruction sets, such as workflows, either from a shared network folder 106 via the network 104 or alternatively from the portable memory device 120 via the port 124. It would be appreciated that the MFP 102 may be configured so that instruction sets or workflows from the portable device 120 can also be uploaded on to the network folder 106. In this way, the user can also use the portable device 120 to update a master list of workflows or instruction sets for processing documents at a central location.

Figure 3:
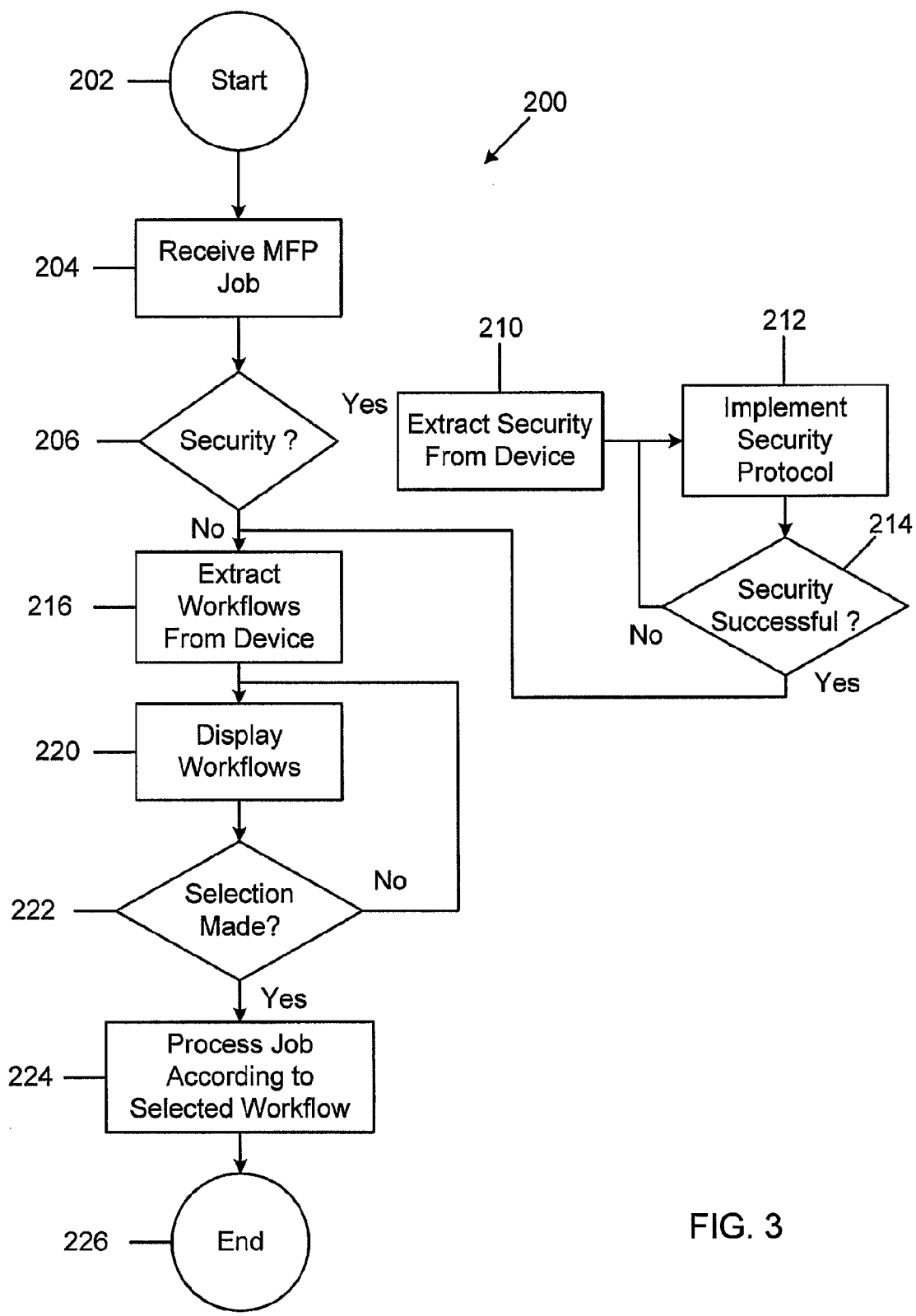
FIG. 3 is an exemplary flow chart illustrating the operation of the system of FIG. 1 as it receives instruction sets from the portable memory device and processes documents according to the received instruction set.
Figure 4A:
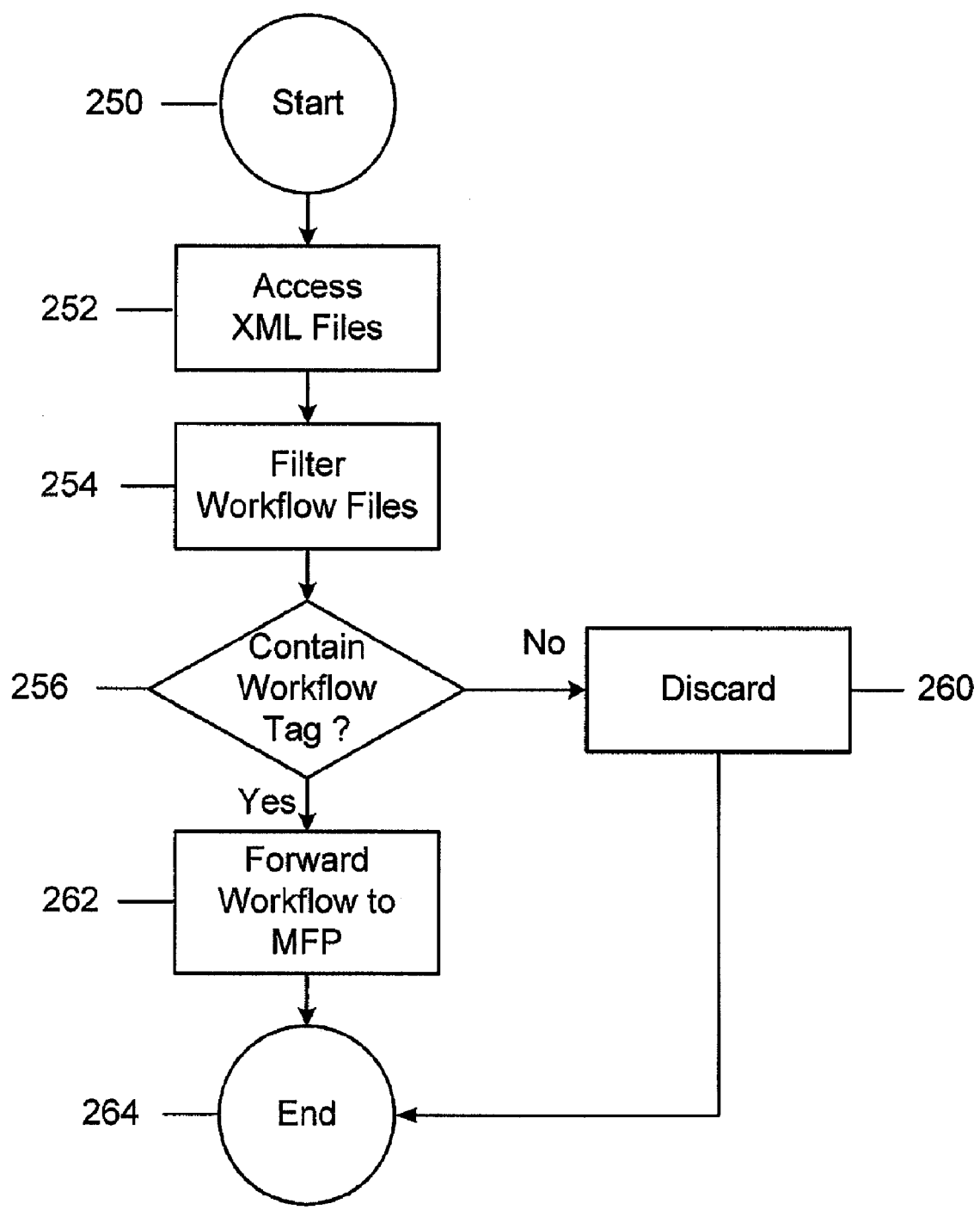
FIGS. 4A and 4B are exemplary flow charts illustrating filtering operations that can be performed by either the MFP or the portable memory device of FIG. 1 or some combination thereof as stored files are filtered so that relevant instruction sets are provided to the MFP.
Figure 4B:
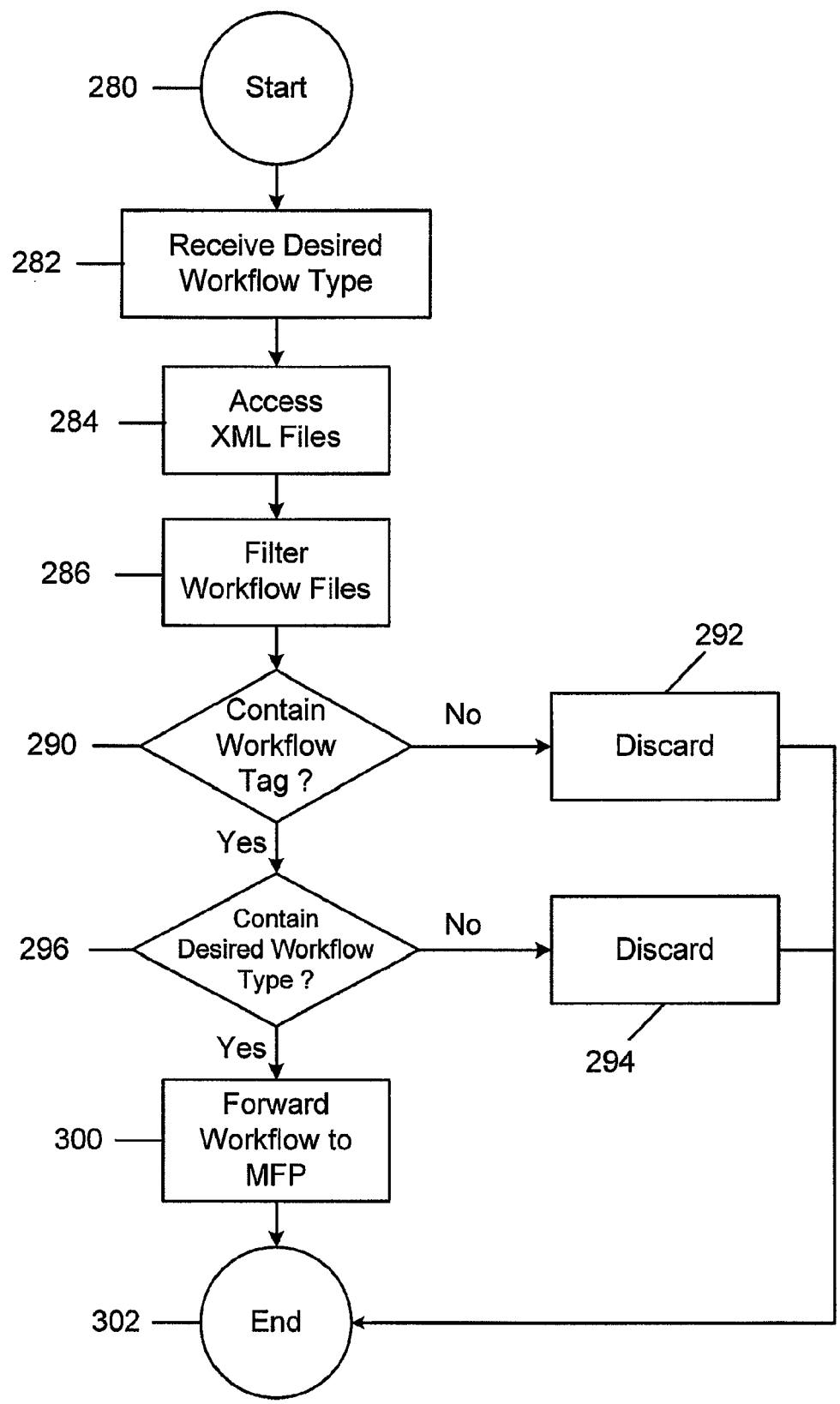

FIG. 3 is an exemplary flow chart illustrating the operation of the MFP 102 as it receives instruction sets or workflows from the portable memory device 120. It will be appreciated that the flow chart of FIG. 3, and also the flow charts of FIGS. 4A and 4B, are simply exemplary of one possible operation flow of the MFP and that variations in this flow may be implemented without departing from the spirit and scope of the present invention.

More specifically, as shown in FIG. 3, from the start state 200 the MFP 102 receives an MFP job, in state 204, from the portable memory device 120. In one implementation, this occurs as a result of the user communicatively coupling the portable memory device 120 with the port 124 on the MFP. The interaction is detected by the MFP 102 and the MFP 102 then determines, in decision state 206, whether there are any security protocols associated with portable memory device 120. It would be appreciated that the portable memory device 120 may include password schemes such that only authorized users of the portable device 120 can actually induce the MFP 102 to implement a particular document processing instruction set. As a result of the portable device 120 being portable, there is an increased risk that the portable device 120 may be accessed by unauthorized individuals and, thus, it may be desirable to implement a security scheme to limit the ability of unauthorized individuals from using the portable device 120 or otherwise accessing the workflows.

If the MFP determines, in decision state 206, that there is a security protocol related to the portable device 120, in this particular implementation, the MFP 102 extracts the security protocol from the device in state 210. Generally, the MFP 102 receives some type of message that contains the security protocol and the security protocol is then implemented in state 212 by the MFP 102. In one exemplary implementation, the portable device 120 can include a security protocol which instructs the MFP 102 to display on the MFP's display 130 a prompt for a password which the user then has to input to the MFP via the input 126 in order to gain access to the instruction sets and workflows in the portable device 120.

In one exemplary implementation, the portable device 120 includes the password which is sent to the MFP 102. The MFP 102 prompts the user, via the display 130, to enter the password and verifies whether the user has done so correctly. If the MFP 102 determines that the security protocol has been successfully completed by the user, the MFP then proceeds to extract instruction sets from the portable device 120 in state 216. Once all of the instruction sets have been extracted, the MFP 102 then preferably displays, in state 220, a list of the workflows to the user via the display 130. The user may have any of a number of different workflow device configurations or other instruction sets on the portable device 120 to handle any of a number of different categories of documents to be processed. By displaying these workflows in state 220, the MFP 102 thereby allows the user to select a particular workflow or instruction sets using the input 126 to process a selected document.

The document to be processed can either be provided to the MFP 102 via the network 104 in which case the user may also have to access the document using the MFP input 126. Further, the document to be processed may also be an electronic document that is also contained on the portable memory device 120 which again the user can access via the MFP input 126. Alternatively, the user may also physically be providing the document to the MFP in a circumstance where the MFP is being used to scan or photocopy or otherwise electronically process a physical document.

Once the MFP 102 determines that the user has selected a particular workflow in decision state 222, the MFP 102 then proceeds to process the document in state 224 according to the selected workflow. Once this process is completed, the MFP 102 proceeds to an end state 226 in a manner known in the art. From the foregoing, it will be appreciated that the MFP 102 is capable of extracting instruction sets, such as workflows, from the portable device and then processing the document accordingly thereby increasing the flexibility of a user to make use of the MFP more independently of network or memory constraints.

One issue that may occur during the process of extracting the instruction sets from the portable device 120 is that the portable device 120 may contain a number of different instruction sets or files not all of which that relate to processing of documents. In that circumstance, it will be necessary for the MFP 102 or the portable device 120 to perform some type of a filtering process so that only the relevant instruction sets or workflows are provided to the MFP.

In one particular implementation, the workflows for processing documents are written in a standard XML format. FIG. 4A illustrates an exemplary process whereby either the portable device 120 or the MFP 102 can filter the stored instruction sets so that only the instruction sets that relate to document processing are forwarded to the MFP 102. More specifically, referring to FIG. 4A, the MFP 102 or the portable device 120 from the start state 250 proceeds to access the XML files in state 252 that are stored in the portable memory device 120. Generally, the XML files will include a standard file format structure which is reproduced below.

Example Tag Structure of Workflow in an XML File Format:

```
<Workflow>
<Input>Where To Obtain Image from: i.e.: Email Inbox, folder,
Scanner<Input>
<Transform>Operations To perform on Image: i.e.: OCR</Transform>
<Transmit>Destination Path to send Image To: folder, FTP, printer,
Web etc.</Transmit>
</Workflow>
```

The portable memory device 120 or the MFP 102 is looking for a particular tag that indicates that an XML document is actually a workflow for processing a document using an MFP. Generally, the tag can appear in the title of the XML document and will generally indicate that this particular class of XML document is an instruction set or workflow for processing documents or is otherwise related to MFPs. If the XML documents do not contain the tag, the documents are discarded in state 260. If the instruction sets or workflows are tagged as MFP documents, the tagged documents are forwarded to the MFP, in state 262, for subsequent display to the user in the manner described above.

As is also shown in FIG. 4B, the MFP 102 may also receive an indication of a desired workflow type. More specifically, it may be desired that only particular workflow types are going to be forwarded to a particular MFP. In this particular circumstance either the MFP 102 or the portable memory device 120 that is doing the filtering receives an indication, in state 282, of the desired workflow type. Workflow types can, for example, include a variety of different operations including scanning, copying, transmitting as email, faxing and the like. In some circumstances the filtering will filter not only XML files that relate to document processing workflow but also will filter only specific type of document processing workflows which are then forwarded to the MFP.

As shown in FIG. 4B, once the desired type is received in state 282 by the MFP 102, the XML files are then accessed in state 284. These files are then filtered in state 286 and the MFP 102 or portable device 120 determines, in decision state 290, whether a file or data object in the portable device 120 contains a workflow tag or some indication that the data object relates to processing documents on an MFP. If the file does not include the tag, it is then discarded and not processed by the MFP. If the file does include the tag, the portable memory device 120 or the MFP 102 then determines, in decision state 296, whether the file is the desired type of instruction set or workflow. If the workflow is the desired type, it is then forwarded to the MFP in state 300, otherwise it is discarded in state 294. In this way, files or instruction sets stored on the portable device can be filtered so that only workflow for processing document and, more specifically, specific types of workflow are forwarded to the MFP for processing.

It will be appreciated that the described embodiments illustrate a system and process whereby the control of MFPs can be accomplished using instruction sets that are stored on portable devices. In this way, reliability issues relating to the memory of the MFP or network issues can be avoided.

Although this invention has been disclosed in the context of certain preferred embodiments, it will be understood by those skilled in the art that the present invention extends beyond the specifically disclosed embodiments to other alternative embodiments and/or use of the invention and obvious modifications and equivalents thereof. It is also contemplated that various components or sub-components of specific features and aspects of the embodiments can be made and still fall within the scope of the invention. It should be understood that various features and aspects of the disclosed embodiments can be combined and substituted for one another in order to form varying modes of the disclosed invention. Thus it is intended that the scope of the present invention herein disclosed should not be limited by the particular disclosed embodiments described above, but should be determined by a fair reading of the claims that follow.

What is claimed is:

1. A multifunction peripheral device comprising:
an input of a security protocol read from a portable memory device for allowing a user input of an instruction set into the multifunction peripheral device;
an output that outputs documents processed according to the instruction sets provided to the multifunction peripheral device by the user; and
an interface that is adapted to communicate with the portable memory device carried by the user so that the user can provide the instructions sets on how to process particular documents to the multifunction peripheral device from the portable memory device.

2. The device of claim 1, wherein the multifunction peripheral device implements workflows on how to process documents that are provided to the device from the portable memory device via the interface.

3. The device of claim 2, wherein the workflows include workflows for inducing the multifunction peripheral device to print, scan, copy or e-mail the documents.

4. The device of claim 1, wherein the interface is a physical port capable of physically interconnecting with the portable memory device.

5. The device of claim, 4, wherein the interface is a USB port that can receive a USB flash memory stick.

6. The device of claim 1, wherein the interface is a functional port that communicates with portable memory device selected from the group of PDAs, personal entertainment devices, memory cards and memory disks.

7. The device of claim 1, wherein the device includes a display that displays a plurality of instruction sets provided from the personal memory device and allows the user to select a desired instruction set from the plurality of displayed instruction sets.

8. The device of claim 7, wherein the device filters instruction sets received from the portable memory device so that the display only displays instruction sets related to operations of the multifunction peripheral device.

9. The device of claim 8, wherein the multifunction peripheral device filters the instruction sets received from the portable memory device so that only instruction sets that implement selected tasks on the multifunction peripheral device are displayed to the user for selection.

10. A multifunction peripheral device comprising:
an input of a security protocol read from a portable memory device for allowing a user input of an instruction set into the multifunctional peripheral device;
an output that outputs documents processed according to the instruction sets provided to the multifunction peripheral device; and
an interface that communicates with the portable memory devices carried by users so that the users can provide the instruction sets on how to process particular documents to the multifunctional peripheral device from the portable memory device and wherein the multifunction peripheral device is further configured to receive instruction sets on how to process documents from other electronic devices via a computer network.

11. The device of claim 10, wherein the multifunction peripheral device implements instruction sets on how to process documents that are provided to the multifunction peripheral device from the portable memory device via the interface.

12. The device of claim 11, wherein the instruction sets include workflows for inducing the multifunction peripheral device to print, scan, copy or transmit electronic copies of the documents via the network to other locations.

13. The device of claim 10, wherein the interface is a physical port capable of physically interconnecting with the portable memory device.

14. The device of claim 13, wherein the interface is a USB port that can receive a USB flash memory stick.

15. The device of claim 10, wherein the interface is a functional port that communicates with portable memory device selected from the group of PDAs, personal entertainment devices, memory cards and memory disks.

16. The device of claim 10, wherein the device includes a display that displays a plurality of instruction sets provided from the personal memory device and allows the user to select a desired instruction set from the plurality of displayed instruction sets.

17. The device of claim 16, wherein the device filters instruction sets received from the portable memory device so that the display only displays instruction sets related to operations of the multifunction peripheral device.

18. The device of claim 17, wherein the multifunction peripheral device filters the instruction sets received from the portable memory device so that only instruction sets that implement selected tasks on the multifunction peripheral device are displayed to the user for selection.

19. A method of processing a document with a multifunctional peripheral device, the method comprising:
loading one or more instructions sets onto a portable memory device that is carried by a user;
communicatively coupling the portable memory device with the multifunction peripheral device so that a security protocol from the portable memory device allows the user to input the one or more instructions sets to the multifunction peripheral device;
displaying the one or more instruction sets on a display associated with the multifunction peripheral device; and
processing a document according to an instruction set selected by the user.

20. The method of claim 19, wherein loading one or more instruction sets onto a portable memory device comprises loading one or more workflows onto the portable memory device.

21. The method of claim 19, wherein loading one or more instruction sets onto a portable memory device comprises loading one or more workflows or configuration parameters for the multifunction peripheral device onto a USB memory stick.

22. The method of claim 19, wherein processing the document according to an instruction set selected by the user comprises printing, copying, faxing, e-mailing or scanning a document.

23. The method of claim 19, further comprising filtering the instruction sets on the portable memory device to only transmit those instruction sets relating to the operation of the multifunction peripheral device.

24. The method of claim 23, further comprising filtering the instruction sets on the portable memory device to only transmit those instruction sets relating to performing a pre-selected task using the multifunction peripheral device.

25. The method of claim 24, wherein the pre-selected task comprises printing, faxing, copying, or forwarding electronic copies of the document.

* * * * *